United States Patent [19]

Bertin

[11] Patent Number: 4,492,283
[45] Date of Patent: Jan. 8, 1985

[54] POWER-ASSISTED STEERING DEVICE FOR MOTOR VEHICLES

[75] Inventor: Patrice Bertin, Paris, France

[73] Assignee: Valeo, Paris, France

[21] Appl. No.: 377,394

[22] Filed: May 12, 1982

[30] Foreign Application Priority Data

May 12, 1981 [FR] France ............................... 81 09391

[51] Int. Cl.³ ............................................. B62D 5/08
[52] U.S. Cl. .................................. 180/148; 91/375 A; 137/625.21
[58] Field of Search ....................... 180/148, 146, 147; 91/375 A; 292/256.6; 137/625.21, 625.24

[56] References Cited

U.S. PATENT DOCUMENTS

| 4,406,341 | 9/1983 | Bertin | 180/148 |
| 4,414,883 | 11/1983 | Dauvergne | 180/148 |
| 4,421,191 | 12/1983 | Bertin et al. | 180/148 |
| 4,436,171 | 3/1984 | Bertin | 180/148 |

FOREIGN PATENT DOCUMENTS

| 2372065 | 6/1978 | France | 180/148 |
| 2448472 | 9/1980 | France | 180/148 |

Primary Examiner—Joseph F. Peters, Jr.
Assistant Examiner—Donn McGiehan
Attorney, Agent, or Firm—Young & Thompson

[57] ABSTRACT

Power-assisted steering device for motor vehicles.

The steering column is in two parts 13A and 13B which have between each other a limited degree of relative angular play and which receive rotor discs 23A and 23B of a hydraulic distributor 21. The rotor discs 23A and 23B are housed in a cavity 25 of a casing 26, with a small degree of axial play between a base 27 of the cavity 25 and a closure member 28 fixed to the casing 26. The closure member 28 is positioned with respect to the casing 26 by lugs 51 which are applied so as to abut against the base 27. The closure member 28 is fixed to the casing 26 by a weld 50.

6 Claims, 7 Drawing Figures

POWER-ASSISTED STEERING DEVICE FOR MOTOR VEHICLES

The present invention relates to a power assisted steering device for motor vehicles, comprising means, operated by the driver, for steering the vehicle which act on means for changing its direction, said means for steering the vehicle including a two-part rotating transmission component, said two parts possessing a limited degree of relative angular play allowing said parts to become offset in the angular sense as a result of the action of said means for steering the vehicle, and power-assistance means which, in response to such angular offset, are allowed to operate on said means for changing the direction of the vehicle in the same sense as that of the means for steering the vehicle, said power-assistance means including a source of hydraulic power, an actuator acting on the means for changing the direction of the vehicle, and a distributor inserted between the supply of hydraulic fluid and the actuator and having at least one rotor disc which is rigidly fixed in rotation to one of the said two parts and is provided with hydraulic passages.

The invention particularly relates to such a device in which the rotor discs are housed in a cavity provided in a casing with a slight degree of axial play between a base of this cavity and a closure member fixed to the casing. The invention particularly relates furthermore to a device of the type stated above in which the closure member and the cavity of the casing are cylindrical and are tightly engaged one within the other over a cylindrical region.

In order to be able to correctly position the closure member in the cavity of the casing, in such a manner that the slight axial play referred to above can be accurately provided, one could arrange for the closure member to come into abutment with a shoulder provided in the cavity of the housing which itself is accurately located. However, bearing in mind the relatively small dimensions of the various parts, it is difficult to provide this shoulder in such a way that the degree of accuracy required can be achieved. Moreover the manners of fixing which are generally put forward for screwing the closure member into the position thus defined do not allow the inside of the distributor to be closed off in a sealed manner from the surrounding environment and this makes it necessary to provide a sealing joint between the closure member and the casing, which complicates the construction.

The present invention has the aim of providing a power-assisted steering device for motor vehicles, of the type specified above, which is completely or partially exempt of these disadvantages and which provides a construction which is particularly simple and convenient.

In accordance with one aspect of the present invention, a power-assisted steering device for motor vehicles of the type specified above is characterized in that the closure member is positioned with respect to the casing by spaced lugs provided on the closure member, which surround the rotor discs and which are applied so as to abut against the base of the cavity in the casing.

By making use of this provision, machining of the lugs can be carried out accurately and in a manner which is easier than machining a shoulder in the cavity, which makes it possible to obtain, in a convenient manner, the degree of axial play referred to above, at right angles to the rotor discs between the base of the cavity in the casing and the closure member.

In particular, one particularly convenient method of carrying out manufacture consists of arranging the rotor discs so as to be in contact with each other and lying against the closure member and then to carry out final machining, using one single operation, on the set of lugs and on the rotor disc which is most remote from the closure member. After such machining has been carried out, there would clearly be no play existing at right angles to the rotors and, in order to re-establish the desired degree of play, provision is made to coat the ends of the lugs of the closure member with a coating of a material which can be applied with a high degree of accuracy.

In this case, in accordance with a further characteristic of the invention, the lugs on the closure member are coated, at least at their ends, with a layer of a substance adapted to define said slight degree of axial play with which the rotor discs are housed between the base of the cavity in the casing and the closure member.

In accordance with a further aspect of the present invention, in which the closure member and the cavity in the casing are cylindrical and tightly engaged one within the other over a cylindrical region, the device is characterized in that the closure member is fixed to the casing by a weld which extends so as to follow said cylindrical region of engagement of the closure member in the cavity in the casing. Preferably, this weld is provided using electron bombardment.

It will readily be understood that such a manner of fixing has the effect not only of firmly attaching the closure member to the casing but also of ensuring sealing between the inside of the distributor and the external environment.

It will also be noted that, when channels are formed in the casing and the closure member and where these cross the cylindrical region where the closure member engages in the cavity in the casing, in particular for allowing circulation of the hydraulic fluid of the distributor, the weld has the effect of not only isolating, in a sealed manner, the inside of the distributor from the external environment, but also ipso facto isolates each channel in a sealed manner at right angles to the cylindrical region of engagement.

Clearly, the fixing using a weld can be carried out by firstly positioning the closure member accurately in the cavity in the casing even where there is no abutment between these two parts.

However, advantageously, the two aspects, referred to above, of the invention are combined, and the closure member, firstly is positioned with respect to the casing using its lugs which are applied so as to bear against the base of the cavity in the casing and, secondly, is fixed to the casing by the weld which extends over the cylindrical region of engagement of the closure member in the cavity of the casing.

Various embodiments of the invention are described below, by way of example, with reference to the attached drawings in which.

Figure 1:
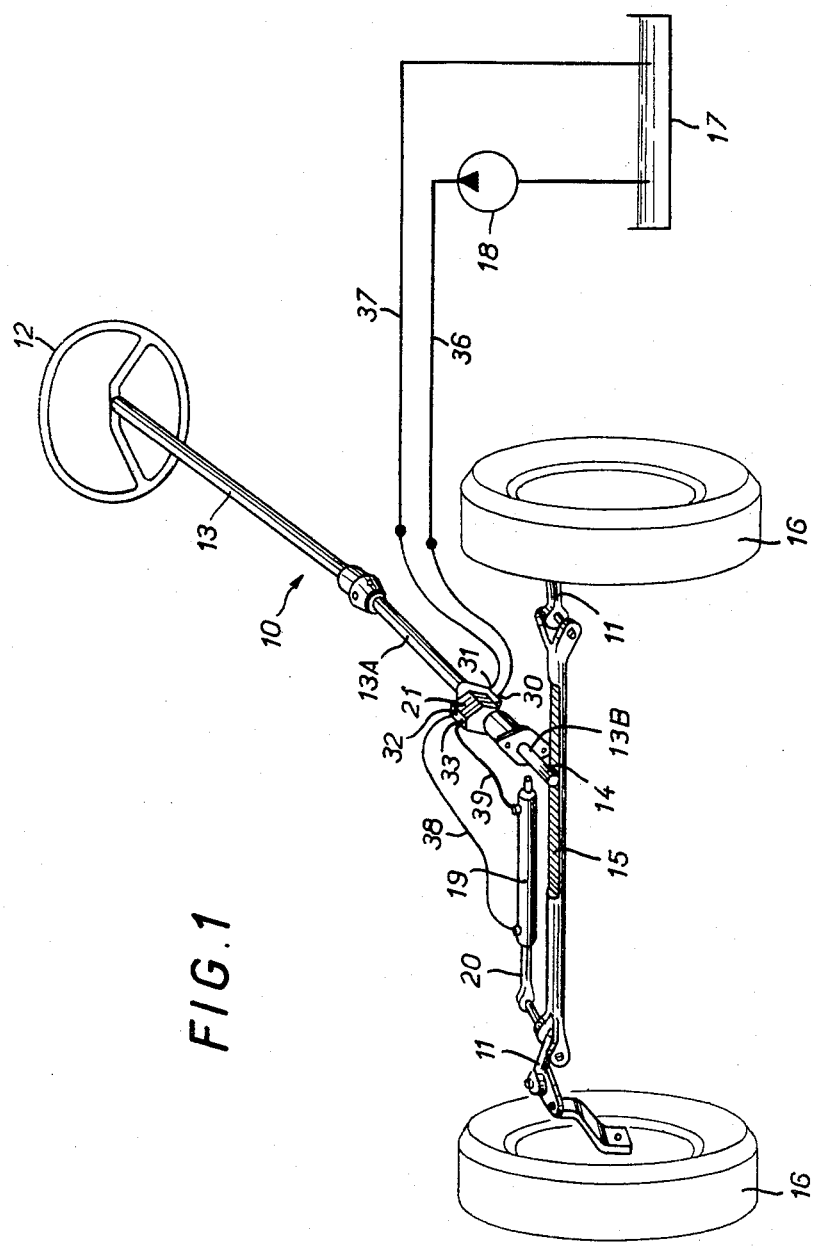
FIG. 1 is a diagrammatical view, in perspective, of a power assisted steering device in accordance with the invention.
Figure 2:
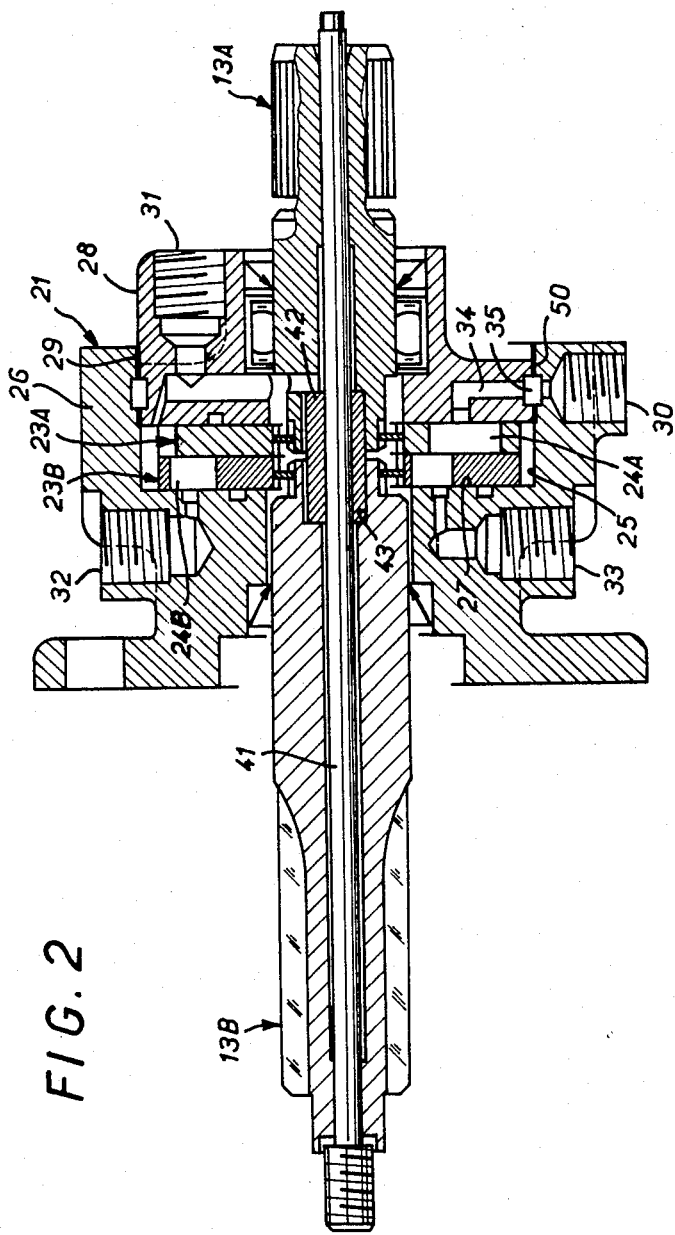
FIG. 2 shows a distributor of this device on an enlarged scale and in longitudinal section.

Reference is first made to FIGS. 1 and 2, which relate, by way of non-limiting example, to the use of the invention in a device for providing power assisted steering in motor vehicles.

The device includes (FIG. 1) steering means operated by the driver, 10 which operate on means for changing the direction of the vehicle such as the track links 11. The means for steering the vehicle 10 consist of a steering wheel 12 and a steering column 13. The latter constitutes a rotating transmission element and includes two aligned parts 13A and 13B which are coupled to each other with a limited degree of relative angular play allowing angular offset between the parts 13A and 13B upon operation of the means for steering the vehicle 10. The part 13A is rigidly fixed to the steering wheel 12 whilst the part 13B is rigidly fixed to a pinion 14 which meshes with a rack 15. The latter controls the orientation of the steered wheels 16 of the vehicle via the track links 11.

A hydraulic fluid supply for providing the power-assistance, 17, 18, includes a reservoir 17 and a pump 18 taking its supply from this reservoir 17. An actuator is made up by a hydraulic jack 19 the piston stem 20 of which acts on the rack 15.

A hydraulic distributor 21 is inserted between the pump 18 and the hydraulic jack 19 and is responsive to the angular offset of the two parts 13A and 13B to cause the hydraulic jack 19 to act on the track links 11 in the same sense as the means for steering the vehicle 10.

In the example shown in FIG. 2, the distributor 21 includes two rotor discs 23A, 23B which are adjacent and respectively rigidly fixed in rotation to the two parts 13A and 13B. The rotor discs 23A and 23B are provided respectively with various hydraulic passages such as the passages 24A and 24B.

Figure 4:
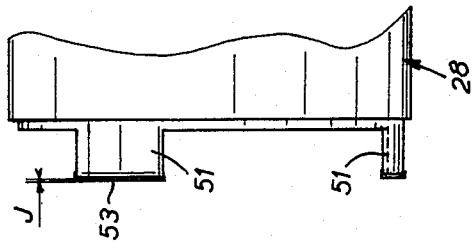
FIG. 4 is a diagrammatical view of a portion of the distributor shown in FIG. 3, in which the slight degree of axial play at right angles to the rotor discs is shown on an enlarged scale in order to facilitate reading of the drawing, this view being shown in longitudinal section in accordance with line IV—IV in FIG. 5.

The rotor discs 23A and 23B are housed in a cavity 25 in a casing 26, with a small degree of axial play J, (shown on an enlarged scale in FIG. 4), between a base 27 of the cavity 25 and a closure member 28 fixed to the casihg 26. To give some idea of the orders of magnitude, the play J is of the order of several hundredths of a millimeter.

The closure member 28 and the cavity 25 are cylindrical and tightly engaged one within the other along a cylindrical region 29.

The passages 24A and 24B of the rotor discs 23A and 23B cooperate with passages formed in the assembly made up by the casing 26 and the closure member 28 and these discharge at orifices 30, 31, 32, and 33. As will be more particularly seen in FIG. 2, one of the passages, designated by reference numeral 34, is associated with the orifice 30 and consists in a channel which extends in the casing 26 and the closure member 28. The channel 34 crosses, at 35, the cylindrical region 29 where the closure member 28 engages in the cavity 25 in the casing 26.

The orifice 30 is a pressure orifice connected by a conduit 36 (FIG. 1) to the pump 18. The orifice 31 is a return orifice connected, by a conduit 37, to the reservoir 17. The orifices 32 and 33 are service orifices connected respectively, by conduits 38 and 39 to the two sides of the hydraulic jack 19 (FIG. 1).

The parts 13A and 13B (FIG. 2) are elastically coupled by means of a torsion bar 41. Moreover, a piece 42 having a prismatic cross-section is rigidly fixed to one of the parts 13A and 13B, for example the part 13A and is engaged with angular clearance in a prismatic cavity 43 on the other part 13B.

It is this angular clearance provided between the piece 42 and the cavity 43 which defines the limited relative angular play between the parts 13A and 13B. This play has an extent of several degrees on both sides of a neutral mean position, or rest position, which tends to be restored and maintained by the torsion bar 41.

Depending on the relative angular position of the two rotor discs 23A and 23B, one or other of the following operating positions is present:

The pressure orifice 30 is put into communication, via the passages 24A and 24B of the rotor discs 23A and 23B, with the return orifice 31 to the reservoir 17, and this corresponds to the neutral rest position and, in this case, the power assistance is not operative.

The pressure orifice 30 is put into communication, via passages 24A and 24B in the rotor discs 23A and 23B, with the service orifice 32, which causes the hydraulic jack 19 to operate in one direction:

The pressure orifice 30 is put into communication, via passages 24A and 24B in the rotor discs 23A and 23B, with the other service orifice 33, which causes the hydraulic jack 19 to operate in the other direction.

In the absence of any action by the driver on the steering wheel 12, the parts 13A and 13B are held in the neutral rest position by the torsion bar 41. The installation operates under open center conditions and the jack 19 has no force applied to it.

When the driver applies a force to the steering wheel 12 in order to change the direction of the wheels 16, the parts 13A and 13B are offset angularly with respect to each other in a determined direction and the relative angular position of the two discs 23A and 23B changes from the neutral rest position to a working position in which the output from the pump 18 passes from the orifice 30 to the corresponding service orifice 32 or 33. The jack 19 thus acts in the direction desired for steering the vehicle.

Should the power-assistance means 17, 18 fail, the steering action performed on the steering wheel 12 has the effect of absorbing the limited relative angular play between the parts 13A and 13B, defined by the piece 42 in the cavity 43. The opposing resistance provided by the torsion bar 41 is easily overcome since, by making use of the rigid connection provided by the piece 42 between the parts 13A and 13B, the part 13B is driven rigidly in rotation by the part 13A which allow the power steering to be replaced by manual steering using the means for steering the vehicle 10, which now directly perform the function of changing the direction of the vehicle.

In the embodiment shown in FIG. 2, the closure member 28 is firstly positioned in the axial sense by simply locating it in the cavity 25 in the casing 26, so as to define exactly the play J, then it is fixed to the casing 26 using a weld 50 which extends along the cylindrical region 29 of engagement of the closure member 28 in the cavity 25 of the casing 26.

This weld 50 is carried out using electron bombardment and is adapted to isolate, in a sealed manner, not only the inside of the distributor 21 from the external environment but also the hydraulic channel 34 which crosses, at 35, the cylindrical region of engagement 29 of the closure member 28 in the cavity 25 of the casing 26.

Closing-off provisions are produced, without any particular precautions being necessary, using the electron bombardment which provides the weld 50. Obviously, if several channels such as the channel 34 cross the region of cylindrical engagement 29, the weld 50 obtained by electron bombardment isolates each one of these channels, and this can be achieved using one single operation.

In the example shown in FIG. 2, the orifices such as orifices 30, 32 and 33 are formed in the casing whilst at least one orifice, such as the orifice 31, is formed in the closure member 28.

Figure 3:
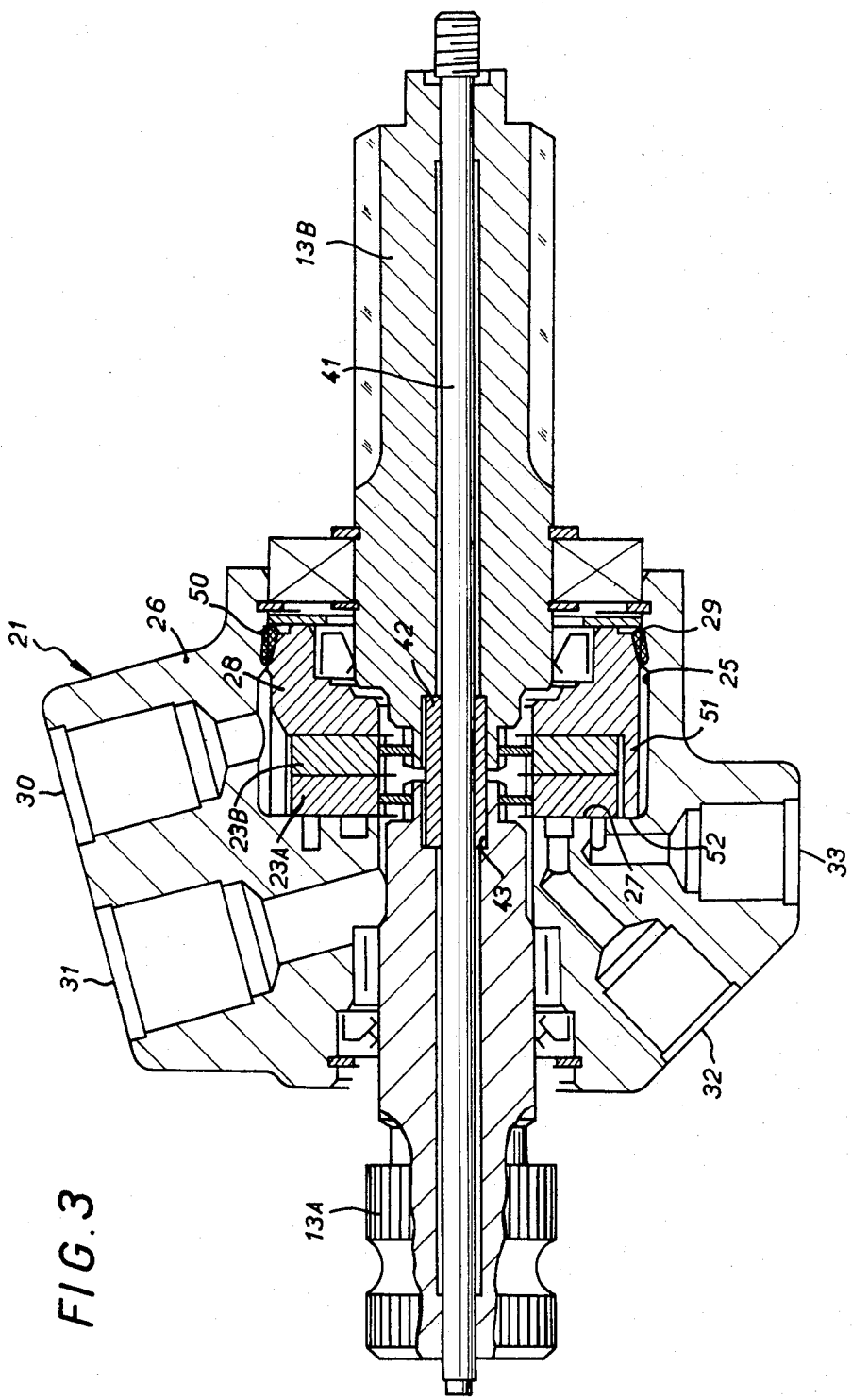
FIG. 3 is a similar view to that shown in FIG. 2 but concerns one variant of the distributor.

Obviously, one could arrange for all the orifices 30, 31, 32 and 33 to be grouped together in the casing 26, and, in this case, the closure member 28 does not include any orifices, as is shown in FIG. 3 to which reference will now be made.

In this variant shown in FIG. 3, the closure member 28 is still fixed to the casing 28 by the weld 50 which extends along the region of cylindrical engagement 29 of the closure member 28 in the cavity 25 of the casing 26 but, additionally, positioning means are provided in order to provide, with a high degree of accuracy, correct axial positioning of the closure member 28 with respect to the casing 26, this being done prior to the weld 50 being performed. Such a position is selected so that the slight axial play J (FIG. 4) is respected at right angles to the rotor discs 23A and 23B.

Figure 5:
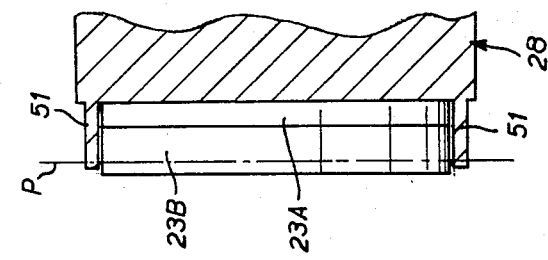
FIG. 5 is a corresponding view, in transverse section, in accordance with line V—V in FIG. 4.
Figure 6:
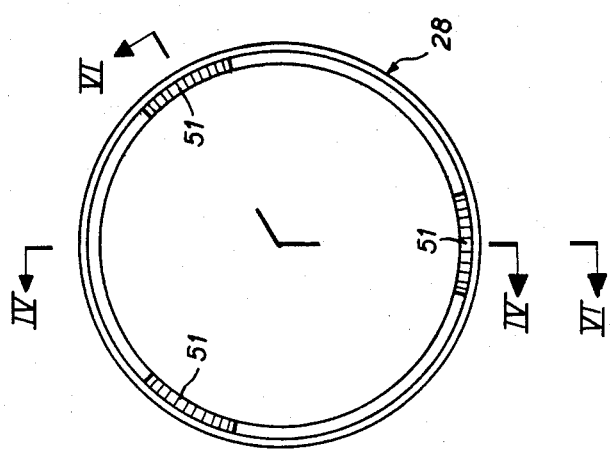
FIG. 6 illustrates one stage in the manufacturing process in which the lugs on the closure member are machined at the same time as one of the rotor discs.
Figure 7:
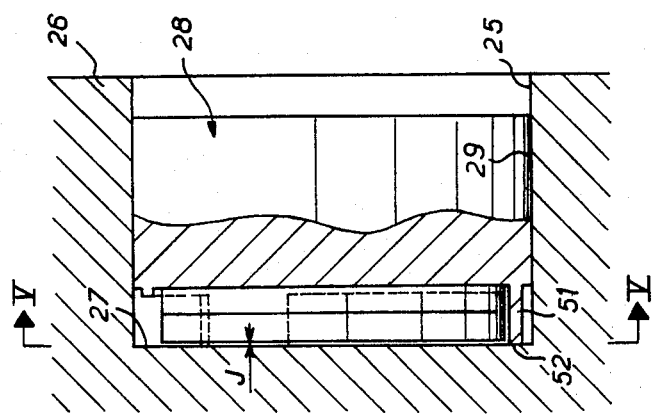
FIG. 7 shows the next stage in the manufacturing process, in which the ends of the lugs on the closure member are coated with a layer of a substance in order to define the slight axial play at right angles to the rotor discs.

For this purpose, the closure member 28 includes lugs 51 (FIGS. 3 to 5) which surround the rotor discs, 23A and 23B and which are applied so as to bear, at 52, against the base 27 of the cavity 25 in the casing 26.

The lugs 51 are circumferentially spaced (FIG. 5) in order not to disturb the hydraulic operation of the distributor 21. The length of the lugs 51 is determined accurately in order to exactly define the play J.

A preferred method of manufacture (FIG. 6) consists in simultaneously machining, along a line of final machining P and at one and the same time, the lugs 51 of the closure member 28 and the rotor disc which is most remote from the closure member 28 and which, in the example of FIGS. 3 to 7, is the rotor disc 23B.

When this final machining has been completed, if one were now to assemble the parts in their existing state, no play would be provided at right angles to the rotor discs 23A, 23B housed between the base 27 of the cavity 25 and the closure member 28.

In order to re-establish this play and to provide it with the desired value J, the lugs 51 of the closure member 28 (FIG. 7) are coated, at least at their ends, with a layer of a substance 53, the thickness of which is equal to the play J. The layer of substance 53 may consist of a layer of chromium or can be obtained using anodizing treatment.

I claim:

1. Power-assisted steering device for motor vehicles, comprising means, operated by the driver, for steering the vehicle 10, acting on means for changing its direction 11, said means 10 for steering the vehicle including a two-part rotating transmission component 13, said two parts 13A, 13B possessing a limited degree of relative angular play allowing said parts 13A, 13B to become offset in the angular sense as a result of the action of said means 10 for steering the vehicle, and power-assistance means 17, 18, 19, 21, which, in response to such angular offset are allowed to operate on said means 11 for changing the direction of the vehicle in the same direction as that of the means 10 for steering the vehicle, said power assistance means including a source of hydraulic power, 17, 18, an actuator 19 acting on the means 11 for changing the direction of the vehicle, and a distributor 21 inserted between the source of hydraulic power 17, 18 and the actuator 19 and having at least one rotor disc 23A, 23B rigidly fixed in rotation to one of said two parts 13A, 13B, said rotor disc 23A, 23B being provided with hydraulic passages 24A, 24B and being housed in a cavity 25 of a casing 26 with a small degree of axial play J between a base 27 of this cavity 25 and a closure member 28 fixed to the casing 26, characterized in that the closure member 28 is positioned with respect to the casing by spaced lugs 51 on the closure member 28 which surround the rotor disc 23A, or 23B and which are applied so as to abut at 52, against the base 27 of the cavity 25 in that casing 26.

2. Power-assisted steering device for motor vehicles, comprising means 10 for steering the vehicle which act on means 11 for changing its direction, said means 10 for steering the vehicle including a two-part rotary transmission component 13, said two parts 13A, 13B possessing a limited degree of relative angular play allowing said parts 13A, 13B to become offset in the angular sense as a result of the action of said means 10 for steering the vehicle, and power-assistance means 17, 18, 19, 21, which, in response to such angular offset are allowed to operate on said means 11 for changing the direction of the vehicle in the same sense as that of the means 10 for steering it, said power-assistance means including a source of hydraulic power 17, 18, an actuator 19 acting on the means 11 for changing the direction of the vehicle and a distributor 21 inserted between the source of hydraulic power 17, 18 and the actuator 19 and having at least one rotor disc 23A, 23B which is rigidly fixed in rotation to one of said two parts 13A, 13B, said rotor disc 23A, 23B being provided with hydraulic passages 24A, 24B and being housed in a cavity 25 of a casing 26 with a small degree of axial play J between a base 27 of this cavity 25 and a closure member 28 fixed to the casing 26, in which the closure member 28 and the cavity 25 of the casing 26 are cylindrical and are tightly engaged one inside the other along a cylindrical region 29, characterized in that the closure member 28 is fixed to the casing 26 by a weld 50 which extends along said cylindrical region 29 of engagement of the closure member 28 in the cavity 25 of the casing 26.

3. Power-assisted steering device for motor vehicles comprising means 10 for steering the vehicle which act on means 11 for changing its direction, said means 10 for steering the vehicle including a two-part rotating transmission component 13, said two parts 13A, 13B possessing a limited degree of relative angular play allowing said parts 13A, 13B to become offset in the angular sense as a result of the action of said means 10 for steering the vehicle, and power-assistance means 17, 18, 19, 21 which in response to such angular offsets are allowed to operate on said means 11 for changing the direction of the vehicle in the same direction as that of the means 10 for steering it, said power-assistance means including a source of hydraulic power, 17, 18, an actuator 19 acting on the means 11 for changing the direction of the vehicle and a distributor 21 inserted between the source of hydraulic power 17, 18 and the actuator 19 and having at least one rotor disc 23A, 23B rigidly fixed in rotation to one of said two parts 13A, 13B said rotor disc 23A, 23B being provided with hydraulic passages 24A, 24B and being housed in a cavity 25 of a casing 26 with a small degree of axial play J between a base 27 of this cavity 25 and a closure member 28 fixed to the casing 26, in which the closure member 28 and the cavity 25 of the casing 26 are cylindrical and are tightly engaged one within the other along a cylindrical region 29, characterized in that the closure member 28 is positioned with respect to the casing 26 by spaced lugs 51 on the closure member 28 which surround the rotor disc 23A or 23B and are applied so as to abut, at 52, against the base 27 of the cavity 25 of the casing 26 and in that the closure member 28 is fixed to the casing 26 by a weld 50 which extends along said cylindrical region 29 of engagement of the closure member 28 in the cavity 25 of the casing 26.

4. Device in accordance with claim 1 or claim 3, characterized in that the lugs 51 of the closure member 28 are coated, at least at their ends, with a layer of a substance 53 which defines said slight degree of axial play J with which the rotor disc 23A or 23B is housed between the base 27 of the cavity 25 of the casing 26 and the closure member 28.

5. Device in accordance with claim 2 or claim 3, characterized in that the weld is carfied out using electron bombardment.

6. Device in accordance with any one of claims 2 or 3, characterized in that said weld 50 is adapted to isolate, in a sealed manner, at least one hydraulic channel 34 which extends in the casing 26 and in the closure member 28 and which crosses the cylindrical region 29 of engagement of the closure member 28 in the cavity 25 of the casing 26.

* * * * *